(12) United States Patent
Sigrist

(10) Patent No.: US 6,671,894 B1
(45) Date of Patent: Jan. 6, 2004

(54) TOILET OVERFLOW CONTROL SYSTEM

(76) Inventor: Ernest Sigrist, 2405 S. Woodslee, South Woodslee, Ontario (CA), N0R-1V0

( * ) Notice: Subject to any disclaimer, the term of this patent is extended or adjusted under 35 U.S.C. 154(b) by 0 days.

(21) Appl. No.: 10/431,037

(22) Filed: May 8, 2003

(51) Int. Cl.$^7$ .......................... E03D 11/02; E03D 11/18
(52) U.S. Cl. ........................ 4/427; 137/392; 137/558
(58) Field of Search .................... 4/427, 437, 406, 4/508; 137/392, 558

(56) References Cited

U.S. PATENT DOCUMENTS

| | | |
|---|---|---|
| 1,956,087 A | 4/1934 | Tracy |
| D203,378 S | 12/1965 | Harold |
| 3,959,828 A | 6/1976 | Acevedo |
| 4,041,557 A * | 8/1977 | Ringler ........................ 4/427 |
| 4,145,767 A | 3/1979 | Ibel |
| 4,402,093 A | 9/1983 | Luker et al. |
| 4,802,246 A * | 2/1989 | Laverty, Jr. .................... 4/427 |
| 5,608,922 A | 3/1997 | Lewis |
| 5,732,417 A * | 3/1998 | Pondelick et al. ............. 4/427 |
| 6,016,577 A | 1/2000 | Cooley |
| 6,052,841 A * | 4/2000 | Mankin et al. ................. 4/427 |

* cited by examiner

*Primary Examiner*—Tuan N. Nguyen
(74) *Attorney, Agent, or Firm*—Donald R. Schoonover

(57) ABSTRACT

A toilet control system includes a sensor mounted on a bowl of a toilet near a top rim of the bowl and which is connected to a control valve unit which is fluidically interposed between a water supply tank and the bowl of the toilet. The control valve unit is normally open to permit flow of water from the water supply tank to the bowl, but is closed when water is sensed near the rim of the bowl to prevent further flow of water to the bowl from the water supply tank.

2 Claims, 1 Drawing Sheet

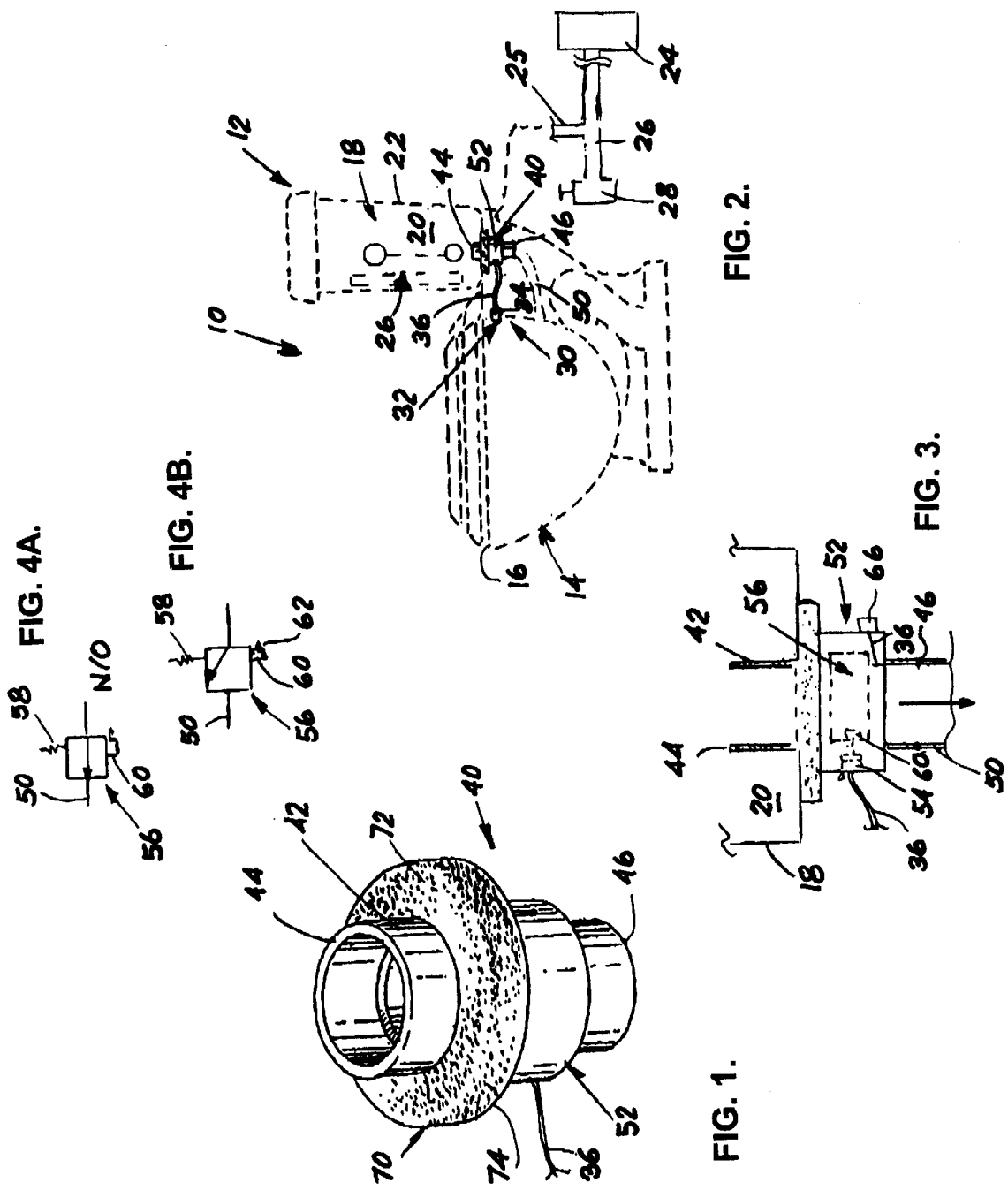

TOILET OVERFLOW CONTROL SYSTEM

BACKGROUND OF THE INVENTION

1. Field of the Invention

The present invention relates to the general art of water closets, and to the particular field of control of water flowing to a water closet.

2. Discussion of the Related Art

Water damage is generally one of the most costly and devastating events that can occur to a homeowner or to someone who owns property. One source of such damage is leaking pipes, another source is water intrusion from outside and yet another source of water damage is associated with overflow of drains.

One source of water is a toilet unit. Toilet units have various seals that may rupture or leak which may provide a path for water to flow out of the toilet unit. Still further, people often throw objects into a toilet that will clog the toilet and prevent water from flowing out of the toilet bowl in a proper manner. Flushing a clogged toilet may cause the toilet to overflow.

Therefore, there is a need to provide a toilet control system which prevents overflow from the toilet bowl.

The art contains many examples of alarms and the like that are intended to warn a person that water is present and thus warn a person that conditions exist in which water damage can occur. While these alarms are helpful, they do not minimize the damage, they only warn that it may occur. That is, if water is flowing onto a floor, the alarm merely alerts someone of the presence of water, it does not initiate steps to minimize the damage associated with water.

Therefore, there is a further need to provide a toilet control system which prevents overflow from the toilet bowl and which prevents water from being supplied to the bowl once water level in the bowl reaches a potentially overflowing location.

Once a toilet has been repaired, it can be safely operated. However, until such repair has been effected, it is risky to continue using a clogged toilet.

Accordingly, there is a need for a means for preventing use of a toilet that has the potential of overflowing until after the toilet has received attention.

Therefore, there is a further need to provide a toilet control system which prevents overflow from the toilet bowl which will prevent water from being supplied to a toilet bowl after the water has reached a potentially overflowing location until after a re-set switch has been activated.

PRINCIPAL OBJECTS OF THE INVENTION

It is a main object of the present invention to provide a toilet control system which prevents overflow from the toilet bowl.

It is another object of the present invention to provide a toilet control system which prevents overflow from the toilet bowl and which prevents water from being supplied to the bowl once water level in the bowl reaches a potentially overflowing location.

It is another object of the present invention to provide a toilet control system which prevents overflow from the toilet bowl which will prevent water from being supplied to a toilet bowl after the water has reached a potentially overflowing location until after a re-set switch has been activated.

SUMMARY OF THE INVENTION

These, and other, objects are achieved by a control system which includes a sensor mounted on a bowl of a toilet near a top rim of the bowl and which is connected to a control valve unit which is fluidically interposed between a water supply tank and the bowl of the toilet. The control valve unit is normally open to permit flow of water from the water supply tank to the bowl, but is closed when water is sensed near the rim of the bowl to prevent further flow of water to the bowl from the water supply tank.

Thus, once water begins to reach a location in the toilet bowl from which that water can overflow, water being supplied to the toilet bowl from the water storage tank of the toilet is stopped. No further water will be supplied to the toilet bowl until a re-set button on the control valve unit is activated, generally manually. This re-set button will not be activated until the problem causing the overflow is corrected.

The toilet control system embodying the present invention prevents toilet water from overflowing the toilet bowl and prevents further water damage if water begins to overflow.

BRIEF DESCRIPTION OF THE DRAWING FIGURES

FIG. 1 is a perspective view of a control valve included in the toilet control system embodying the present invention.

FIG. 2 shows the toilet control system embodying the present invention in combination with a toilet and a water supply system for the toilet.

FIG. 3 is an elevational view of the toilet control system embodying the present invention.

FIG. 4A is a schematic showing a water control valve element included in the toilet control system embodying the present invention in a normally open, flow-permitting, configuration.

FIG. 4B shows the water control valve element in a closed, flow-preventing, configuration.

DETAILED DESCRIPTION OF THE PREFERRED EMBODIMENT

Other objects, features and advantages of the invention will become apparent from a consideration of the following detailed description and the accompanying drawings.

Referring to the figures, it can be understood that the present invention is embodied in a toilet control system 10 which will prevent overflow of a toilet and will also shut off water to a toilet that is in an overflow condition or is nearing an overflow condition. Toilet control system 10 comprises a toilet unit 12 which includes a bowl 14 having a top rim 16. Toilet unit 10 further comprises a water supply tank 18 fluidically connected to the bowl 14. The water supply tank 18 includes an interior volume 20 and an exterior surface 22. A water supply 24, such as a utility water supply, is indicated in FIG. 2, and a water supply conduit 25 fluidically connects the water supply tank 18 to the water supply 24. A flush control mechanism 26 is located in the water supply tank 18 and controls the flow of water from the water supply 24 to the bowl 14 via the water supply tank 18 in a known manner. A manually operated valve 28 is also included to manually control the flow of water from the water supply 24 to the water supply tank 18.

As discussed above, some toilet units may overflow for various reasons and water associated with such overflow may damage floors or furniture. The toilet control system 10 of the present invention prevents this while permitting normal operation of the toilet unit 12.

The toilet control system 10 of the present invention includes a sensor unit 30 which includes a water sensor element 32 which is mounted on the bowl 14 near the top rim 16 of the bowl 14. Sensor unit 30 includes a signal generator 34 which generates a signal when water in the bowl 14 contacts the water sensor element 32. The signal is communicated by an electrical connection 36, but could also be wirelessly transmitted as well.

A fluid connection unit 40 is mounted on the water supply tank 18 to be fluidically interposed between the water supply tank 18 and the bowl 14. The fluid connection unit 40 includes a tubular element 42 having a first end 44 located in the interior volume 20 of the water supply tank 18 and which is in fluid communication with water in the water supply tank 18 and a second end 46 which is located outside the water supply tank 18.

A fluid connection element 50 fluidically connects the second end 46 of the tubular element 42 to the bowl 14 of the toilet unit 12. The fluid connection element 50 operates in the manner known to those skilled in the art and thus will not be further discussed.

A control unit 52 is mounted on the tubular element 42 outside the water supply tank 18 and includes a signal receiver 54 which is electrically connected to the signal generator 34 of the sensor unit 30 to receive signals generated by the signal generator 34 of the sensor unit 30. A valve 56 is movably mounted on the tubular element 42 and is movable between a flow-permitting configuration indicated in FIG. 4A in which fluid flow from the water supply tank 18 to the bowl 14 of the toilet unit 12 via the fluid connection element 50 of the fluid connection unit 40 is permitted and a flow-preventing configuration indicated in FIG. 4B in which fluid flow from the water supply tank 18 to the bowl 14 of the toilet unit 12 via the fluid connection element 50 of the fluid connection unit 40 is prevented.

A biasing element 58, such as a spring or the like, is located on the valve 56 and biases the valve 56 into the flow-permitting configuration. This is indicated in FIG. 4A as "N/O", or "normally open."

A valve control element 60 is located on the valve 56 and is electrically connected to signal receiver 54 of the control unit 52 to be activated when a signal is received by the signal receiver 54 on the control unit 52 from the signal generator 34 of the sensor unit 30. Valve control 60 element moves the valve 56 into the flow-preventing configuration against the bias of the biasing element 58 when the valve control element 60 is activated by a signal received from the signal generator 34 of the sensor unit 30.

A re-set button 62 is electrically connected to valve control element 60 to de-activate the valve control element 60 when the re-set button 62 is manually activated.

After an overflow situation in which the sensor 32 has detected the presence of water in the bowl 14 near the rim 16 of the bowl 14 and has generated a signal that has activated the valve control element 60 to move the valve 56 from the normally open configuration into the closed configuration, the condition causing the overflow will have to be repaired. Once the repair is completed, the person making the repair will be required to manually activate the re-set button 62. This ensures that attention has been paid to the system before water is permitted to again flow from the water supply tank 18 to the bowl 14. An alarm 66, which can be visual, audible, or both, can also be connected to the sensor 32 to be activated when the sensor 32 detects water near the rim 16 of the bowl 14.

An annular fluid seal 70 is located on the tubular element 42 and is interposed between the control unit 52 of the fluid connection unit 50 and the exterior surface 22 of the water supply tank 18. The seal 70 can be formed of any suitable material and has a first surface 72 which abuts the exterior surface 22 of the end of the water supply tank 18 and a second surface 74 which abuts the top end of control unit 52.

It is to be understood that while certain forms of the present invention have been illustrated and described herein, it is not to be limited to the specific forms or arrangements of parts described and shown.

What is claimed and desired to be covered by Letters Patent is:

1. A toilet control system comprising:
   a) a toilet unit which includes a bowl having a top rim, a water supply tank fluidically connected to the bowl, the water supply tank including an interior volume and an exterior surface, a water supply, a water supply conduit fluidically connecting the water supply tank to the water supply, and a flush control mechanism in the water supply tank controlling the flow of water from the water supply to the bowl via the water supply tank;
   b) a sensor unit which includes a water sensor element mounted on the bowl near the top rim of the bowl and a signal generator which generates a signal when water in the bowl contacts the water sensor element;
   c) a fluid connection unit mounted on the water supply tank to be fluidically interposed between the water supply tank and the bowl and which includes
      (1) a tubular element having a first end located in the inside volume of the water supply tank and in fluid communication with water in the water supply tank and a second end located outside the water supply tank,
      (2) a fluid connection element fluidically connecting the second end of the tubular element to the bowl of said toilet unit,
      (3) a control unit mounted on the tubular element outside the water supply tank and including
         (A) a signal receiver which is electrically connected to the signal generator of said sensor unit to receive signals generated by the signal generator of said sensor unit,
         (B) a valve movably mounted on the tubular element and movable between a flow-permitting configuration in which fluid flow from the water supply tank to the bowl of said toilet unit via the fluid connection element of said fluid connection unit is permitted and a flow-preventing configuration in which fluid flow from the water supply tank to the bowl of said toilet unit via the fluid connection element of said fluid connection unit is prevented,
         (C) a biasing element on the valve biasing the valve into the flow-permitting configuration,
         (D) a valve control element on the valve and electrically connected to the signal receiver of the control unit to be activated when a signal is received by the signal receiver on the control unit from the signal generator of said sensor unit, the valve control element moving the valve into the flow-preventing configuration against the bias of the biasing element when the valve control element is activated by a signal received from the signal generator of said sensor unit, and (E) a re-set button electrically connected to the valve control element to de-activate the valve control element when the reset button is manually activated; and d) annular fluid seal on said tubular element and interposed between the control unit of said fluid connection unit and the exterior surface of the water supply tank.

2. A toilet control system comprising:

a) a sensor mounted on a bowl of a toilet near a top rim of the bowl;

b) a fluid connection unit mounted on the water supply tank to be fluidically interposed between the water supply tank and the bowl and which includes (1) a tubular element having a first end located in the inside volume of the water supply tank and in fluid communication with water in the water supply tank and a second end located outside the water supply tank, (2) a fluid connection element fluidically connecting the second end of the tubular element to the bowl of said toilet unit, (3) a control unit mounted on the tubular element outside the water supply tank and including (A) a signal receiver, which is electrically connected to the signal generator of said sensor unit to receive signals generated by the signal generator of said sensor unit, (B) a valve movably mounted on the tubular element and movable between a flow-permitting configuration in which fluid flow from the water supply tank to the bowl of said toilet unit via the fluid connection element of said fluid connection unit is permitted and a flow-preventing configuration in which fluid flow from the water supply tank to the bowl of said toilet unit via the fluid connection element of said fluid connection unit is prevented, (C) a biasing element on the valve biasing the valve into the flow-permitting configuration, (D) a valve control element on the valve and electrically connected to the signal receiver of the control unit to be activated when a signal is received by the signal receiver on the control unit from the signal generator of said sensor unit, the valve control element moving the valve into the flow-preventing configuration against the bias of the biasing element when the valve control element is activated by a signal received from the signal generator of said sensor unit, and (E) a re-set button electrically connected to the valve control element to de-activate the valve control element when the re-set button is manually activated.

* * * * *